US007716171B2

(12) United States Patent
Kryger

(10) Patent No.: US 7,716,171 B2
(45) Date of Patent: *May 11, 2010

(54) SNAPSHOT INDEXING

(75) Inventor: Nathan Kryger, Snoqualmie, WA (US)

(73) Assignee: EMC Corporation, Hopkinton, MA (US)

(*) Notice: Subject to any disclaimer, the term of this patent is extended or adjusted under 35 U.S.C. 154(b) by 361 days.

This patent is subject to a terminal disclaimer.

(21) Appl. No.: 11/207,588

(22) Filed: Aug. 18, 2005

(65) Prior Publication Data

US 2007/0043790 A1 Feb. 22, 2007

(51) Int. Cl.
G06F 12/00 (2006.01)
G06F 17/30 (2006.01)
(52) U.S. Cl. .................... 707/204; 707/673; 711/162
(58) Field of Classification Search ........... 707/1–10, 707/100–104.1, 200–206; 711/161, 162, 711/1–5, 11
See application file for complete search history.

(56) References Cited

U.S. PATENT DOCUMENTS

| | | | |
|---|---|---|---|
| 5,233,513 A | 8/1993 | Doyle | |
| 5,303,042 A | 4/1994 | Lewis et al. | |
| 5,371,851 A | 12/1994 | Pieper et al. | |
| 5,403,639 A * | 4/1995 | Belsan et al. | 707/204 |
| 5,481,701 A | 1/1996 | Chambers, IV | |
| 5,625,818 A | 4/1997 | Zarmer et al. | |
| 5,627,974 A | 5/1997 | Watts et al. | |
| 5,905,988 A | 5/1999 | Schwartz et al. | |
| 6,021,437 A | 2/2000 | Chen et al. | |
| 6,173,325 B1 | 1/2001 | Kukreja | |
| 6,212,512 B1 | 4/2001 | Barney et al. | |
| 6,223,343 B1 | 4/2001 | Hopwood et al. | |
| 6,256,773 B1 | 7/2001 | Bowman-Amuah | |
| 6,415,300 B1 | 7/2002 | Liu | |
| 6,434,680 B2 | 8/2002 | Belknap et al. | |
| 6,549,992 B1 * | 4/2003 | Armangau et al. | 711/162 |
| 6,591,377 B1 | 7/2003 | Evoy | |
| 6,751,604 B2 | 6/2004 | Barney et al. | |
| 6,802,025 B1 | 10/2004 | Thomas et al. | |
| 6,839,721 B2 | 1/2005 | Schwols | |
| 6,845,486 B2 | 1/2005 | Yamada et al. | |
| 6,861,951 B2 | 3/2005 | Reghetti et al. | |
| 6,983,287 B1 | 1/2006 | Jayanti et al. | |
| 6,983,317 B1 | 1/2006 | Bishop et al. | |
| 7,043,485 B2 | 5/2006 | Manley et al. | |

(Continued)

FOREIGN PATENT DOCUMENTS

WO   WO 2004/047078    6/2004

OTHER PUBLICATIONS

Levy et al., Incremental recovery in main memory database systems, Dec. 1992, IEEE, vol. 4, 529-540.*

(Continued)

*Primary Examiner*—Jean B Fleurantin
(74) *Attorney, Agent, or Firm*—Van Pelt, Yi & James LLP

(57) ABSTRACT

Managing backup data comprises accessing a snapshot of a data set, wherein the data set includes at least one object and the snapshot includes a replica of the data set, and adding to an index associated with the snapshot, with respect to each of one or more objects included in the snapshot, index data indicating at least where the object is located within the snapshot.

23 Claims, 11 Drawing Sheets

U.S. PATENT DOCUMENTS

| | | | |
|---|---|---|---|
| 7,047,250 | B1 | 5/2006 | Agarwal et al. |
| 7,069,277 | B2 | 6/2006 | Okada et al. |
| 7,096,264 | B2 | 8/2006 | Bonney et al. |
| 7,113,934 | B2 | 9/2006 | Levesque et al. |
| 7,165,079 | B1* | 1/2007 | Chen et al. ............ 707/202 |
| 7,197,520 | B1 | 3/2007 | Matthews et al. |
| 7,200,616 | B2 | 4/2007 | Takeuchi et al. |
| 7,203,711 | B2 | 4/2007 | Borden et al. |
| 7,225,208 | B2 | 5/2007 | Midgley et al. |
| 7,237,075 | B2 | 6/2007 | Welsh et al. |
| 7,257,606 | B2 | 8/2007 | Kapoor et al. |
| 7,328,260 | B1 | 2/2008 | Muthiyan et al. |
| 7,330,997 | B1 | 2/2008 | Odom |
| 7,409,644 | B2 | 8/2008 | Moore et al. |
| 7,529,782 | B2 | 5/2009 | Prahlad et al. |
| 2002/0021869 | A1 | 2/2002 | Griffin |
| 2002/0032754 | A1 | 3/2002 | Logston et al. |
| 2002/0046275 | A1 | 4/2002 | Crosbie et al. |
| 2002/0083037 | A1 | 6/2002 | Lewis et al. |
| 2002/0083053 | A1 | 6/2002 | Richard et al. |
| 2002/0107877 | A1 | 8/2002 | Whiting et al. |
| 2002/0188590 | A1 | 12/2002 | Curran et al. |
| 2003/0046313 | A1 | 3/2003 | Leung et al. |
| 2003/0093709 | A1 | 5/2003 | Ogawa et al. |
| 2003/0120818 | A1 | 6/2003 | Ho |
| 2003/0131098 | A1 | 7/2003 | Huntington et al. |
| 2003/0135703 | A1 | 7/2003 | Martin et al. |
| 2003/0140204 | A1 | 7/2003 | Ashton et al. |
| 2003/0159007 | A1 | 8/2003 | Sawdon et al. |
| 2003/0182301 | A1* | 9/2003 | Patterson et al. ......... 707/102 |
| 2004/0010487 | A1* | 1/2004 | Prahlad et al. ............ 707/1 |
| 2004/0088334 | A1 | 5/2004 | Klein |
| 2004/0133602 | A1 | 7/2004 | Kusters et al. |
| 2004/0181691 | A1 | 9/2004 | Armingaud et al. |
| 2004/0199626 | A1 | 10/2004 | Nuggehalli |
| 2004/0230737 | A1* | 11/2004 | Burton et al. ............ 711/3 |
| 2004/0246123 | A1 | 12/2004 | Kawabe et al. |
| 2004/0261070 | A1 | 12/2004 | Miller et al. |
| 2004/0267836 | A1* | 12/2004 | Armangau et al. ......... 707/203 |
| 2005/0021565 | A1* | 1/2005 | Kapoor et al. ............ 707/200 |
| 2005/0021869 | A1 | 1/2005 | Aultman et al. |
| 2005/0027702 | A1 | 2/2005 | Jensen et al. |
| 2005/0055328 | A1 | 3/2005 | Yagawa |
| 2005/0065986 | A1 | 3/2005 | Bixby et al. |
| 2005/0086241 | A1 | 4/2005 | Ram et al. |
| 2005/0086342 | A1 | 4/2005 | Burt et al. |
| 2005/0120242 | A1 | 6/2005 | Mayer et al. |
| 2005/0131990 | A1 | 6/2005 | Jewell |
| 2005/0166082 | A1 | 7/2005 | Williams et al. |
| 2005/0187992 | A1* | 8/2005 | Prahlad et al. ............ 707/204 |
| 2005/0228832 | A1 | 10/2005 | Ghotge et al. |
| 2005/0278393 | A1 | 12/2005 | Huras et al. |
| 2005/0283567 | A1 | 12/2005 | Popescu-Stanesti et al. |
| 2006/0029038 | A1 | 2/2006 | Jungck |
| 2006/0031468 | A1 | 2/2006 | Atluri et al. |
| 2006/0112151 | A1 | 5/2006 | Manley et al. |
| 2006/0225065 | A1 | 10/2006 | Chandhok et al. |
| 2006/0282439 | A1 | 12/2006 | Allen et al. |
| 2007/0061505 | A1 | 3/2007 | Deng et al. |
| 2007/0136463 | A1 | 6/2007 | Guenther et al. |

OTHER PUBLICATIONS

Shrira, et al., SNAP: efficient snapshots for back-in-time execution, Apr. 5-8, 2005, IEEE, 434-445.*
U.S. Appl. No. 60/640,971, filed Dec. 31, 2004, Kushwah et al.
U.S. Appl. No. 11/084,179, filed Mar. 18, 2005, Kushwah et al.
U.S. Appl. No. 11/084,065, filed Mar. 18, 2005, Kushwah et al.
U.S. Appl. No. 11/084,679, filed Mar. 18, 2005, Kushwah et al.
U.S. Appl. No. 11/084,066, filed Mar. 18, 2005, Kushwah et al.
U.S. Appl. No. 11/084,067, filed Mar. 18, 2005, Kushwah et al.
Author Unknown, FAST Data Search™ Product Line, Version 4.0, 2004, All Pages.
Author Unknown, FAST Data Search, the Enterprise Search Solution, Jul. 18, 2005 http://www.fastsearch.com/us/products/fast_data_search, All Pages.
Google, Google Enterprise Solutions Google search for your business, Jul. 18, 2005, http://www.google.com/enterprise/, All Pages.
Google, Google Enterprise Solutions: Google Search Appliance, Jul. 18, 2005, All Pages.
Peter J. Varman & Rakesh M. Verma, An Efficient Multiversion Access Structure, May/Jun. 1997, IEEE Transactions on Knowledge and Data Engineering, vol. 9, No. 3, All Pages.
Berners-Lee et al., "Uniform Resource Identifier (URI): Generic Syntax," Standards Track, Jan. 2005, Network Working Group, All Pages.

* cited by examiner

| Field Name | Length (Bytes) | Purpose |
|---|---|---|
| Flags | 4 | General Settings Pertaining to this Entry (e.g., the Entry can be Overwritten.) |
| Object Name Offset | 2 | Offset to the Object's Name from the Start of the Entry. |
| Object Name Length | 2 | Length of the Object's Name, in Characters. |
| Version Table Offset | 2 | Offset to the Version Table from the Start of the Entry. |
| Version Table Length | 2 | Number of Version Entries in Version Table. |
| Parent Entry | 8 | Entry ID of Parent Entry (i.e. Parent Directory). |
| Continuation Entry | 8 | Entry ID of Continuation Entry in Case We Fill this One Up. |
| Child Table Offset | 2 | Offset to the Table of Children. This Enables Browsing Capability. |
| Child Table Entries | 4 | Length of the Child Table, in Entries. |

↳ 402

| Field Name | Length (Bytes) | Purpose |
|---|---|---|
| Snapshot Entry ID | 2 | ID of the Snapshot Entry within the Snapshot Table (in the Very First Entry of the Database). This identifies the Snapshot this Version of the File Resides in. |
| File Size | 8 | Size of this Version of the File. |
| Last Modified Time | 8 | Time this Version of the File was Last Modified. |

↳ 404

| Field Name | Length (Bytes) | Purpose |
|---|---|---|
| Child Entry ID | 8 | Identifies the Entry that Represents the Child. |

FIG. 4B

SNAPSHOT INDEXING

BACKGROUND OF THE INVENTION

Reliable data backup is an important requirement of computer systems today. Traditional backup systems typically perform backup by copying file systems onto data storage media such as tapes or optical disks. For file systems containing large amounts of data, the copying process often takes a long time. Therefore, traditionally backups have been performed relatively infrequently, such as on daily or weekly basis. More recently, "snapshot" type backup systems and/or programs have been provided, which are capable of storing backup data more frequently, in some cases as often as a user requests. However, traditionally to use backup data to restore a particular file or other stored object, e.g., a particular prior version of a file, a user has had to undergo lengthy restore operations. Each backup data set in which the file might be included would be used to "restore" the source data set to a state associated with the backup data, and then the file system of the restored data set traversed to search for the desired file. This restore and browse approach can consume excessive time and resources, particularly with backup data being generated more and more frequently, as "snapshot" and related technologies permit. It would be useful, therefore, to have a way to enable users to more quickly and easily access specific files and other objects from backup data.

BRIEF DESCRIPTION OF THE DRAWINGS

Various embodiments of the invention are disclosed in the following detailed description and the accompanying drawings.

FIG. 4B illustrates the details of the header, version and children sections of an index entry example as implemented in some embodiments.

BRIEF SUMMARY OF THE INVENTION

Backup data is managed. A snapshot of a data set is accessed, where the data set includes at least one object and the snapshot includes a replica of the data set. Index data indicating at least where an object is located within the snapshot is added to an index associated with the snapshot with respect to each of one or more objects included in the snapshot.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing data backup is disclosed. In some embodiments, snapshots of a data set are taken at various times. The data set includes one or more objects. Information about the objects is stored in an index database. In some embodiments, the index database includes for each object in the data set an index entry that includes information indicating for each version of the object stored in connection with a snapshot a location of the version within the snapshot data. The snapshot may be stored locally or remotely. The index database allows the user to browse or search for entries of interest. Relevant entries or versions of entries can be retrieved from the snapshot data and presented to the user.

Figure 1:
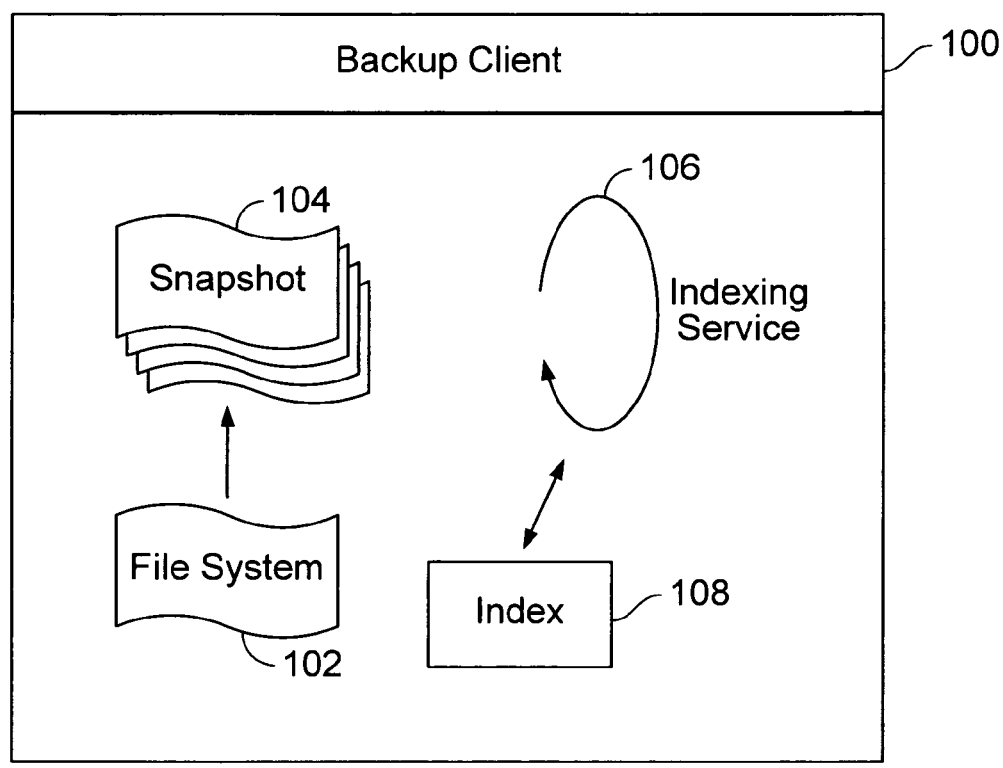
FIG. 1 is a block diagram illustrating an embodiment of a backup system.

FIG. 1 is a block diagram illustrating an embodiment of a backup system. In this example, backup client 100 includes data subject to backup operations. Backup client 100 can be implemented as computer code, a hardware device, a software/hardware combination or any other appropriate system or system components. Applicable data for the backup operations includes various types of systematically organized data sets comprised of files, directories, databases, or other appropriate data objects. Replicas of the data sets are taken at different times and stored as backups. As used herein, a replica of the data set is also referred to as a snapshot.

In the example shown, the data set to be backed up is a file system 102, which includes a systematically organized collection of files and directories. For purposes of clarity, the following examples only refer to file objects and directory objects, although other types of objects such as database objects can also be used.

Multiple snapshots 104 of the file system are taken at different times. Various techniques for taking snapshots are employed in different system implementations. For example, in some systems, a special purpose device driver duplicates file system data on multiple disks as the data is created or modified. When the system issues a command to take a snapshot, the data on a designated disk is preserved and serves as a snapshot of the file system for backup purposes. Multiple snapshots may be created for a file system. The maximum number of snapshots depends on the implementation of the backup system. Different snapshots may be identified using version numbers, time stamp, or other appropriate identification techniques. In some embodiments, to make room for new snapshots, older snapshots may be set to expire or overwritten. In some embodiments, an application running on client 100 and/or another host generates and stores the snapshots 104.

In the example shown, an indexing service 106 manages an index 108. The index is a database that includes information about data objects in the snapshots. It can be used for browsing, searching or otherwise retrieving specific data objects stored in the snapshots. As will be shown in more details below, the index service is configured to update the entries in index 108 based on the snapshots.

In this example, snapshots 104 are shown to be local to the backup client. In other words, backup client 100 can access the snapshot without requiring data transfer on a network. In some systems, the snapshots may be stored remotely, such as on a networked storage device, a server or the like. Similarly, indexing service 106 and index 108 may also be located locally or remotely with respect to the backup client.

Figure 2:
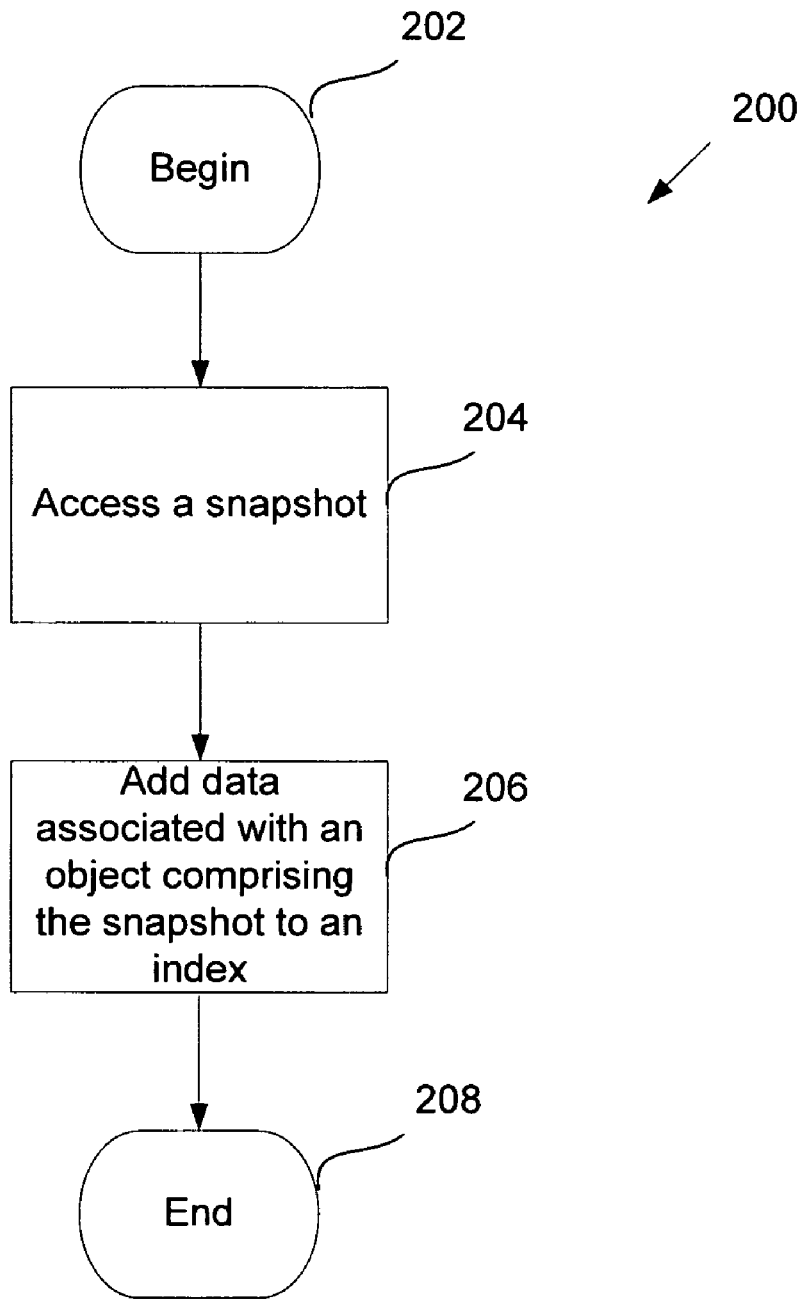
FIG. 2 is a flowchart illustrating an embodiment of a process for managing backup data.

FIG. 2 is a flowchart illustrating an embodiment of a process for managing backup data. Process 200 is implemented as a part of indexing service 106 in some embodiments. The process is configured to manage the snapshot index and may operate on a backup client or other appropriate remote device. In the example shown, the process begins when a snapshot becomes available (202). The snapshot is accessed (204). Data associated with an object comprising the snapshot is added to an index (206). In some embodiments, an index entry that corresponds to an object in the snapshot is updated to indicate the relative location of the object within the snapshot. In some embodiments, data is added to the index for each object comprising the snapshot.

Figure 3:
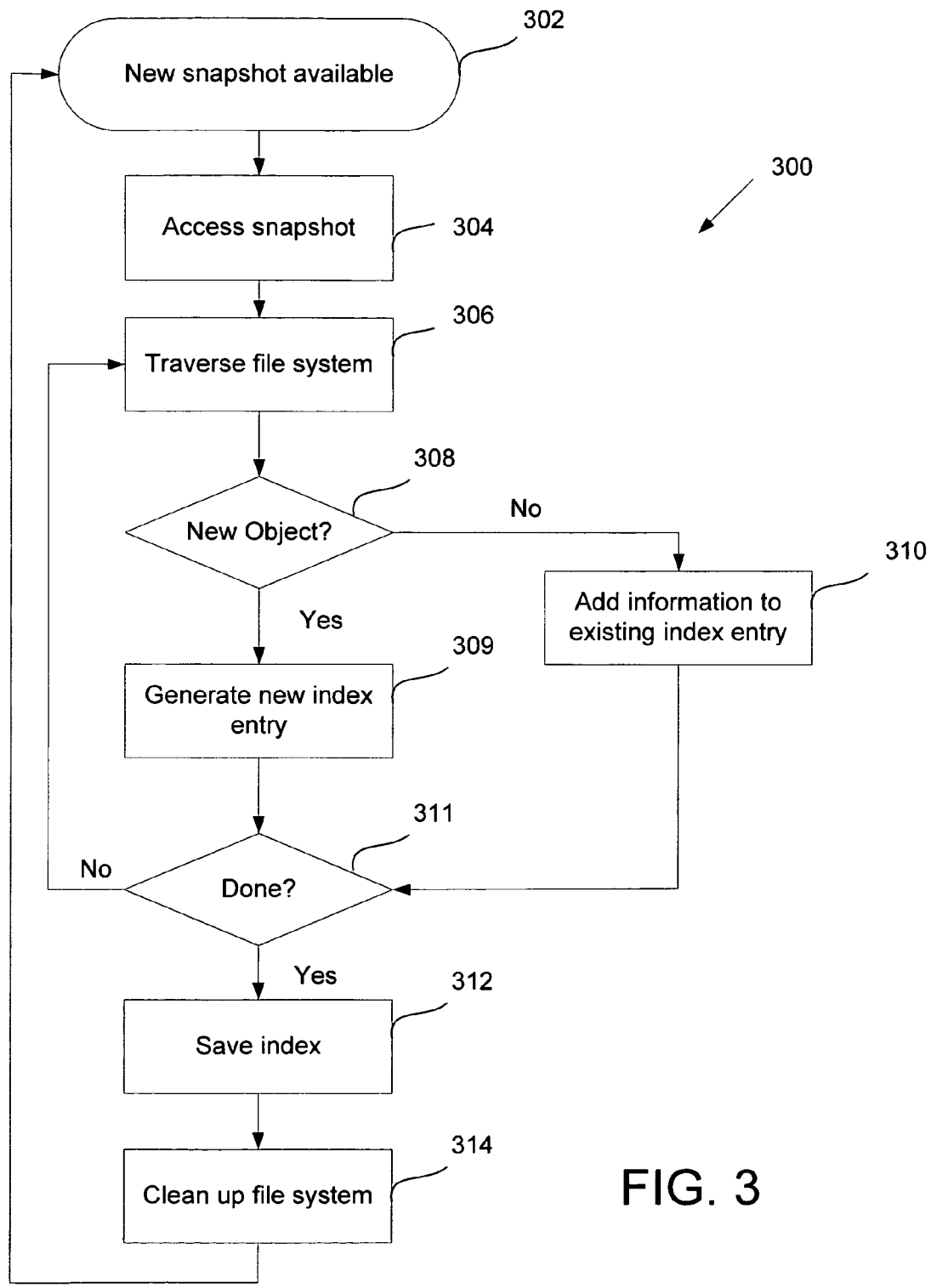
FIG. 3 is a flowchart illustrating an embodiment of a backup data management process.

FIG. 3 is a flowchart illustrating an embodiment of a backup data management process. In this example, process 300 is performed sometime after the snapshot is created. The indexing service receives an indication that a new snapshot is available (302). The snapshot is accessed (304). In some embodiments, accessing the snapshot includes mounting the snapshot to enable the snapshot data to be accessed by navigating a corresponding file system. The file system is then traversed to locate each file system object such as files or directories (306). In some embodiments, the file system is traversed without requiring that the snapshot be mounted.

During the traversal, the index entry for each file system object is updated (308-311). It is determined whether the object is new (308). A file system object is new if, for example, it has no corresponding index entry in the index. If the file system object is new, a new index entry for the new file system object is generated and added to the index (309). If, however, the file system object is not new (i.e., it has an existing index entry), then information about the file system object in the current snapshot is added to the existing, corresponding entry (310). The entry update process (308-310) is repeated until all file system objects have been traversed (311). When the traversal is complete and the index entries have been updated, the index is saved (312). The file system is then un-mounted and cleaned up (314). When another new snapshot becomes available, the process repeats and the index entries are updated based on the file system objects in the new snapshot. In this example, if the same object appears in more than one snapshot, a single index entry associated with the object is updated each time the object is encountered in a snapshot, e.g., by adding to the entry data indicate the presence and/or location of the object, and/or a version thereof, within the snapshot. In some embodiments, a separate entry is made for each instance of an object encountered in a snapshot.

Figure 4A:
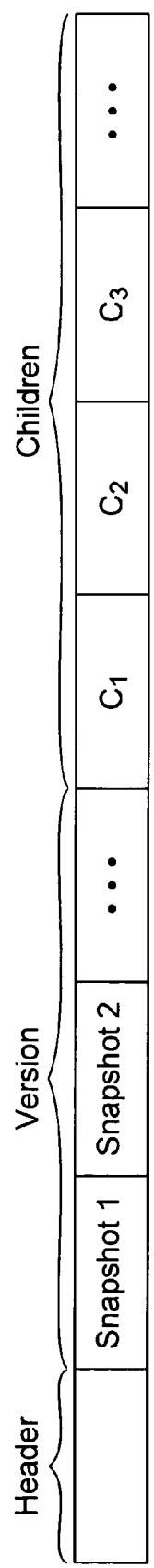
FIG. 4A is a diagram illustrating the layout of an index entry according to some embodiments.

In some embodiments, the index is a database that includes multiple index entries. FIG. 4A is a diagram illustrating the layout of an index entry according to some embodiments. In this example, the database is implemented in a table format with a fixed length entry. Each entry is referenced and located using its position in the table. In other words, the identifier of each entry corresponds to its entry number in the table, and an entry can be accessed if its identifier (or its offset in the table) is known. During a search operation, the table is searched linearly to locate one or more matching entries. In some embodiments, the media in which the index is stored supports faster linear access than random access, thus linear search requiring linear access is faster than hierarchical search requiring random access.

Each of the index entries has the layout shown in 400 and each corresponds to a file system object. The index entry includes information useful for accessing the file system object and its parent or children in the snapshots. As shown, an index entry includes three sections: a header section for storing general information about the file system object (e.g. file name or object name), a version section for storing information about different versions of the object, e.g., as found in different snapshots, and a children section for storing information about the object's children.

In some embodiments, the object's children include objects, such as file system objects (e.g., files and directories), if any, that occur in a next level below the parent object in a hierarchical structure with which the parent object is associated, e.g., a file system directory or structure associated with the snapshot in which the object is included and/or a source data set with which the snapshot is associated. In some embodiments, capturing in the index entry of FIG. 4A data identifying an object's parent (e.g., in the header) and/or children, if any, enables a hierarchical representation of the data to be presented, e.g., by providing a file system or directory type interface that enables a user to browse a hierarchical structure to find a particular object of interest, if desired.

FIG. 4B illustrates the details of the header, version and children sections of an index entry example as implemented in some embodiments. The example entry has an identifier that corresponds to its position in the table. Table 402 shows the layout of the header section, which includes fields for storing general information about the index entry, such as the offsets and lengths of the object's name, version table and child table information, identifier of the entry's parent directory, etc. In case that the fields of this entry are filled up, further information about the entry is stored in a continuation entry, whose identifier is included in the header.

The version section of this example includes one or more version entries corresponding to one or more versions of snapshots. The snapshots are stored in a snapshot table. Table 404 shows the layout of one version entry, which includes an identifier that identifies the snapshot table entry that is associated with the snapshot within which the version with which the version entry is associated resides, the size of the version of the file in the snapshot, and the time this version of the object was last modified.

Each children section in this example includes one or more child entries. Table 406 shows the layout of one child entry, which includes the identifier of the index entry that represents the child.

Although FIGS. 4A-4B illustrate the layout of an index that is a flat file with fixed length entries, variable length entries, entries with different fields and different layout are sometimes used in other embodiments as appropriate.

Figure 5:
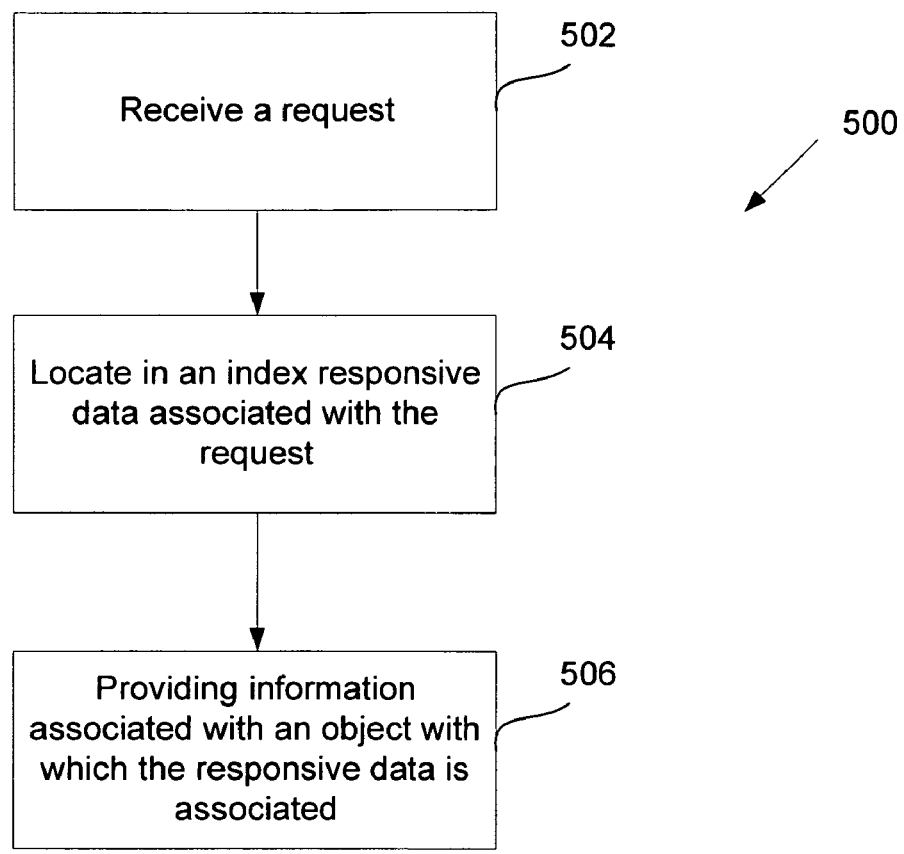
FIG. 5 is a flowchart illustrating an embodiment of a process for using the snapshot index to recover previously stored data.

A user may wish to access the snapshots and recover data from them, such as a previous version of a file or other object. FIG. 5 is a flowchart illustrating an embodiment of a process for using the snapshot index to recover previously stored data. Process 500 is implemented as a part of the indexing service in some embodiments. In some embodiments, the process is implemented separately and is capable of cooperating with the indexing service. In the example shown, process 500 begins when a request is received (502). As will be shown in more details below, such a request includes browsing or searching the snapshots. Responsive data associated with the request is located in an index (504). In this example, the index is a snapshot index that includes entries that identify one or more objects comprising one or more snapshots of a data set and the responsive data includes an appropriate index entry in the snapshot index that corresponds to the request. Information associated with the object with which the responsive data is associated, such as information about the object's snapshots, is provided to the caller routine that made the request (506).

Figure 6:
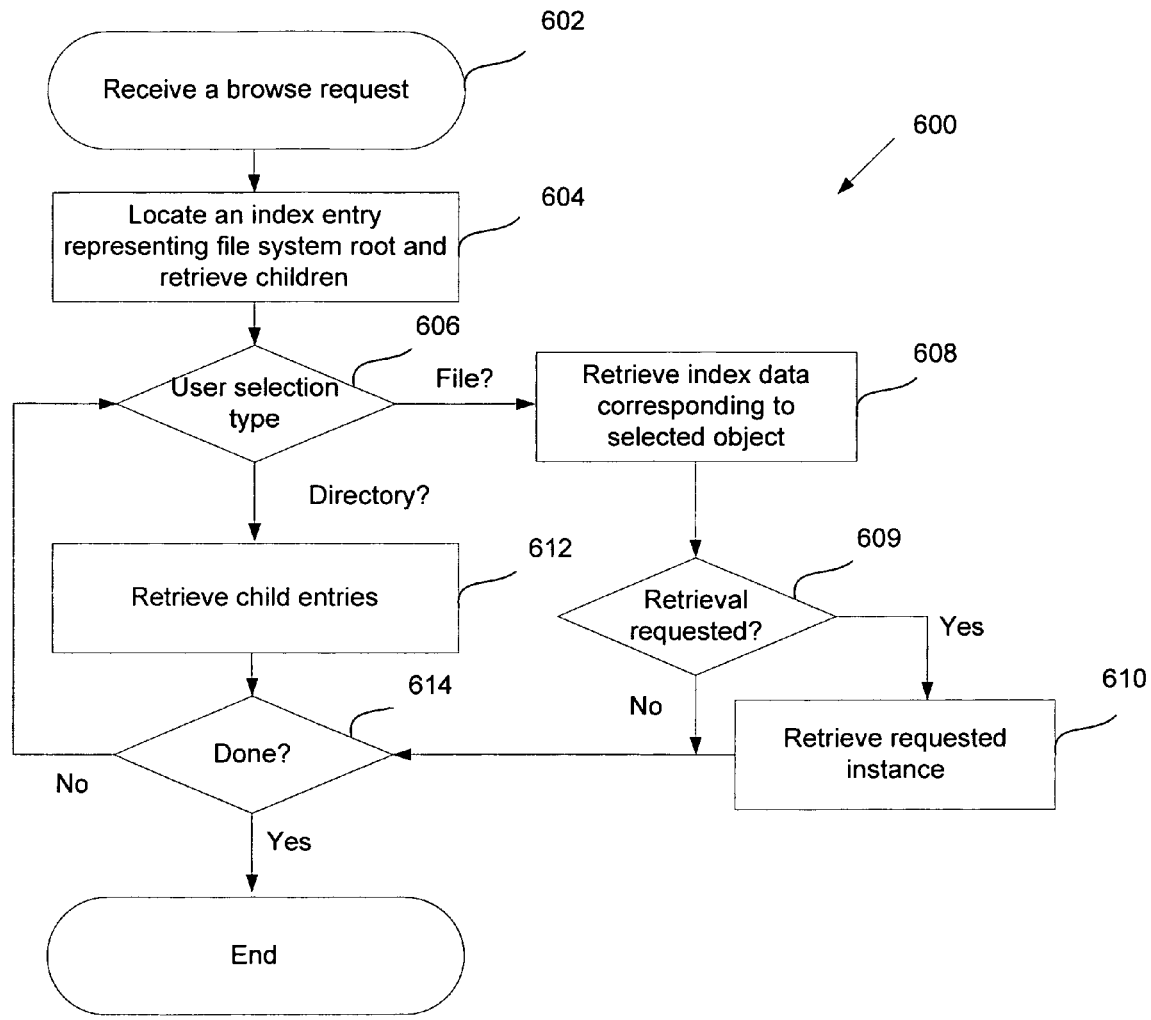
FIG. 6 is a flowchart illustrating an embodiment of a process for browsing backup data.

FIG. 6 is a flowchart illustrating an embodiment of a process for browsing backup data. In this example, information in the snapshot index is represented to the user via a user interface, allowing the user to browse the snapshots. Process 600 initiates when a browse request is received (602). In the example shown, the browse request is received when a user makes a browse request via the user interface. The index entry representing the root of the file system (or other hierarchical structure, in the case of a source data set other than a file system) is then located and the child entries are retrieved (604). In some embodiments, the root of the file system occupies a fixed location in the index (e.g. the second entry in the index).

The user may continue to browse by making a selection in the user interface. Once a user selection is made and received, the type of selection is determined (606). In this case, the user may select a directory object or a file object. If a file object is selected, index data corresponding to the selected file object is accessed and retrieved (608). The index data includes information about different versions of snapshots, which is displayed to the user in the user interface. The user has the option to request via the user interface that a particular instance of an object be retrieved, e.g., from data associated with the snapshot with which the instance of the object is associated. The process enters into a state of waiting for the user to make a request. If such a request is made (609), the requested instance of the object, e.g., a particular version, is retrieved and made available to the user (610). If the user does not make such a request, the process continues to wait until the user indicates that he has finished with browsing (614).

If the user selected a directory (606), the child entries of the selected directory are retrieved and optionally displayed to the user (612). The user again has the option of selecting from the children a directory or a file (608). Thus, the process of retrieving either the children of the selected directory (614) or file-related index data/snapshot (608-610) is repeated. The user may close the window, click on a "clear" button provided in the user interface or otherwise indicate that he has finished browsing; or, he may continue to browse (614).

Figure 7:
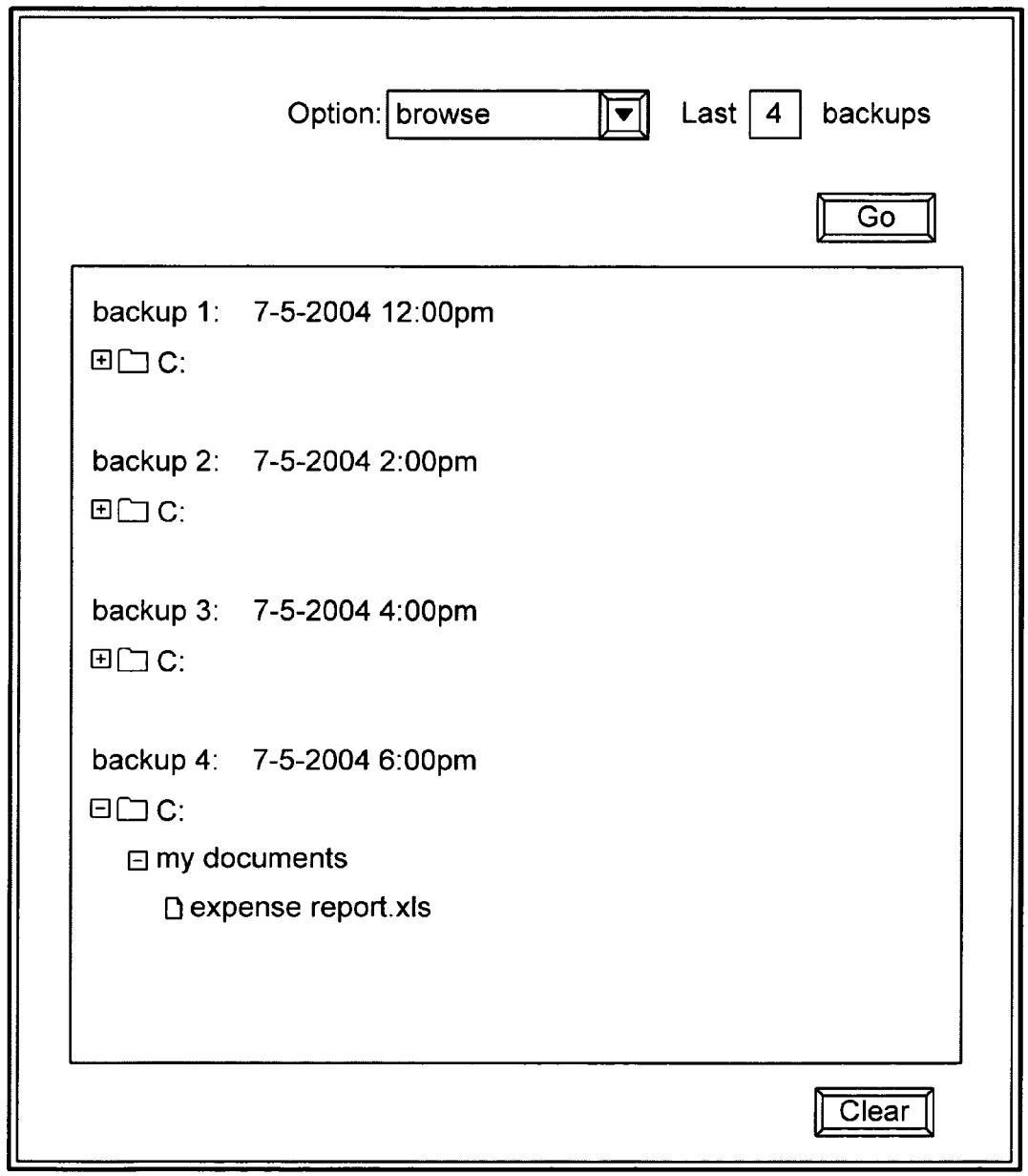
FIG. 7 is a diagram illustrating an example of a user interface for browsing.

FIG. 7 is a diagram illustrating an example of a user interface for browsing. User interface 700 shown in this example gives the user the option to select the number of snapshots to be presented in the user interface. The user may browse a particular snapshot by making a selection. A "clear" button is provided to allow the user to clear his selection and start over.

Figure 8:
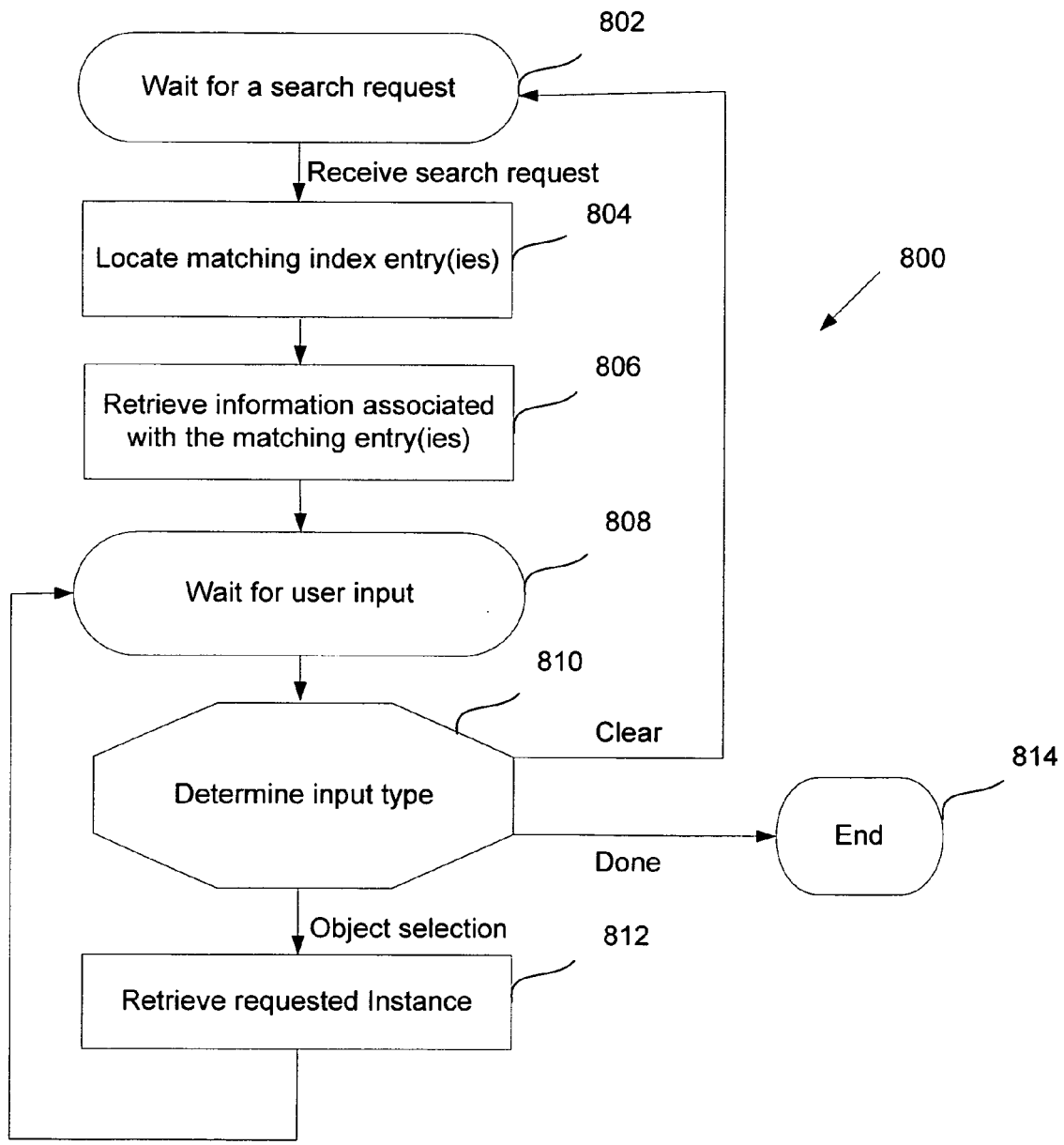
FIG. 8 is a flowchart illustrating an embodiment of a process for searching backup data.

FIG. 8 is a flowchart illustrating an embodiment of a process for searching backup data. In this example, process 800 initiates in a state of waiting for a search request from a user (802). The request includes query information such as a search string used for file name matching, the number of versions to be searched, etc. When a search request is received, the process compares the search string with the file names in the index entries to locate one or more potential matches (804). In some embodiments, the search examines all the entries to find all potential matches. Information associated with the potential matches (e.g., version information of the snapshots) is retrieved and optionally displayed to the user (806). The process then enters into a state of waiting for user input (808). Once a user input is received, its type is determined (810). If the user input is one which selects an instance of an object from the matching entries, the requested instance is retrieved and optionally displayed to the user (812). If the user input is one which clears the search results, the process returns to the initial state to wait for a new search request input (802). If the user input indicates that the user is done with searches, the process ends (814).

Figure 9:
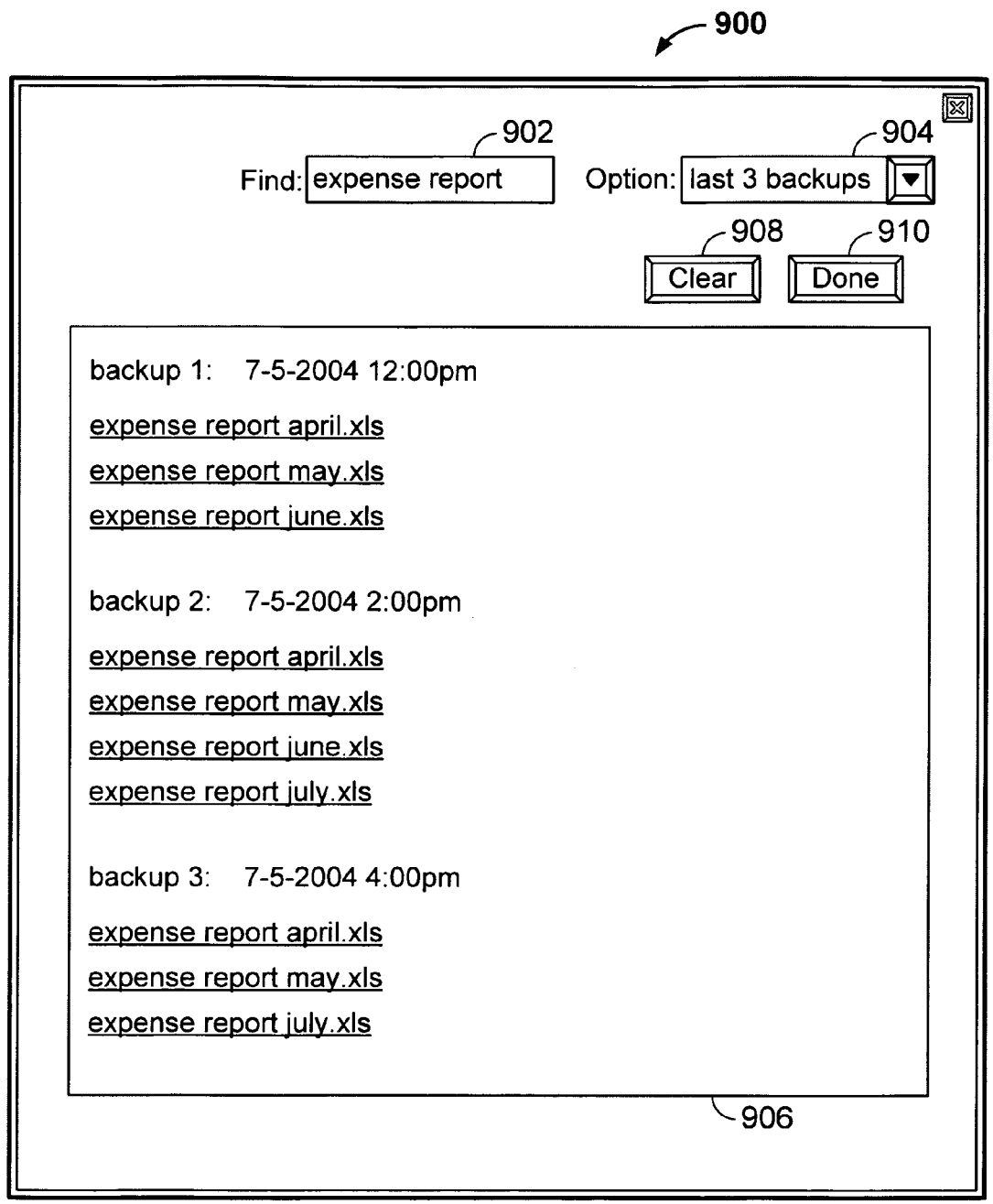
FIG. 9 is a diagram illustrating an embodiment of a user interface for searching backup data.

FIG. 9 is a diagram illustrating an embodiment of a user interface for searching backup data. User interface 900 shown in this example gives the user the option of choosing the number of backups used in the search. The user selects the number of backups searched via menu 904. The search string is entered in box 902. Matching entries from the last three backups (in the example shown, because the user has selected "last 3 backups" via menu 904) are displayed in area 906. The user can view, save or otherwise recover an instance of a file by clicking on the desired file name. For example, a file such as "Expense Report June.xls" which existed in some snapshots but became deleted in later snapshots can be found and retrieved. The user can clear the search result by pressing button 908 or close the search window by pressing button 910.

Figure 10:
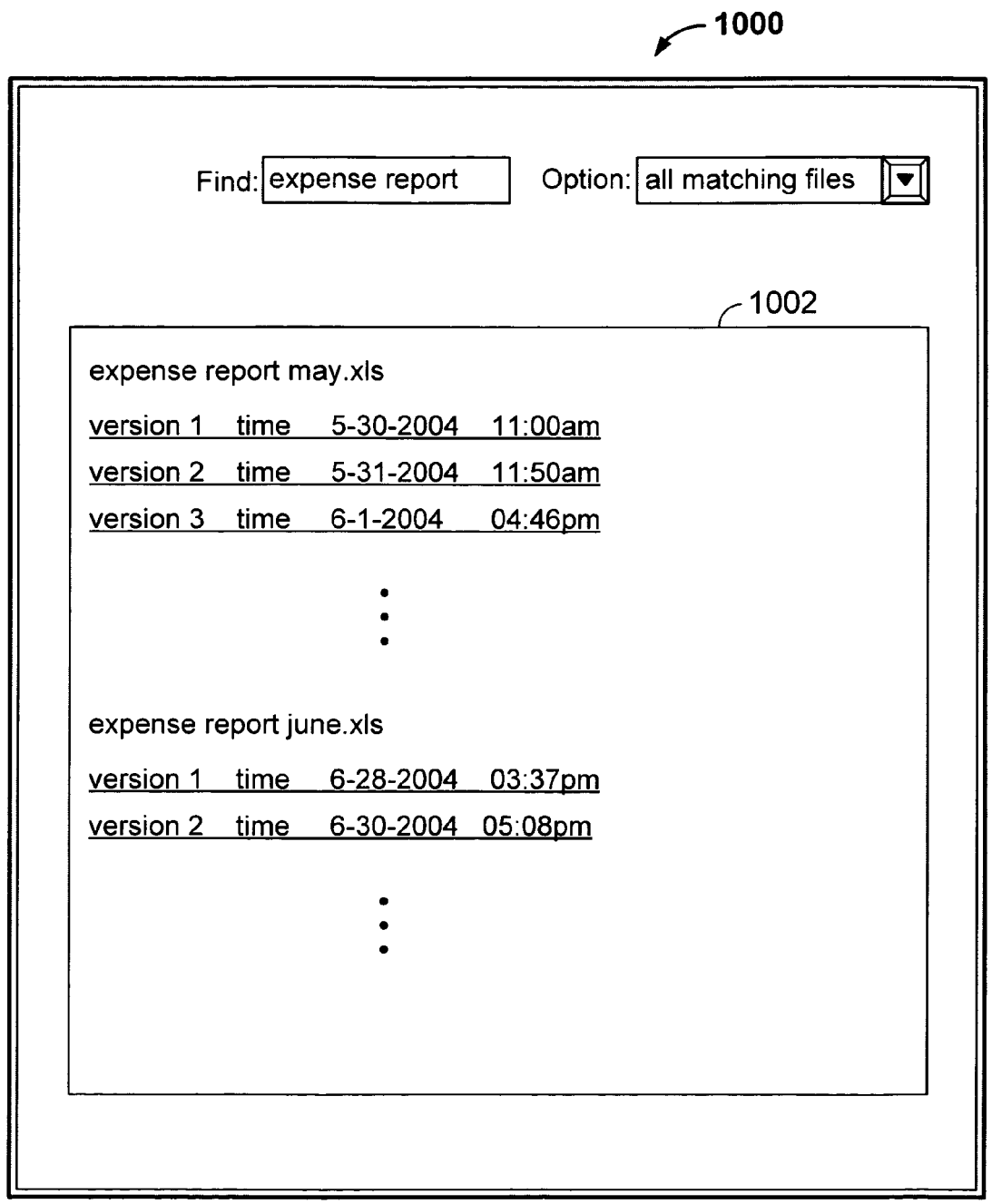
FIG. 10 is a diagram illustrating an embodiment of a user interface for searching backup data.

FIG. 10 is a diagram illustrating an embodiment of a user interface for searching backup data. User interface 1000 shown in this example gives the user the option of finding, from among all files stored in the backup data for which an index is available, all files that match the search string entered by the user. The search results are displayed in area 1002, where version information associated with each matching file is displayed and selectable.

Managing data backup has been disclosed. The techniques described allow the user to access backup data without having to mount and navigate the file system (or other hierarchical structure) of each snapshot or other backup data set in which an object of interest may reside. The location within backup data of an object of interest, such as a particular version of a file of interest, can be determined and, if desired, the object can be retrieved and provided to the user quickly and easily.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing backup data, comprising:

accessing a snapshot of a data set, wherein the data set includes at least one object and there is a plurality of snapshots of the data set, each of the plurality of snapshots being taken at a particular time and each comprising a replica of the data set at that particular time; and adding to an index stored in storage and associated with at least the accessed snapshot, with respect to each of one or more objects included in the accessed snapshot, index data indicating at least where each of the one or more objects is located within the accessed snapshot so that it is able to be determined using the index and without again accessing the accessed snapshot whether an object of interest is included in the accessed snapshot and if so, where the object of interest is located within the accessed snapshot, wherein the index is configured to be used to determine, without having to mount the accessed snapshot, whether the object of interest is included in the accessed snapshot.

2. A method as recited in claim 1, wherein the snapshot is stored locally with respect to the data set.

3. A method as recited in claim 1, wherein the data set includes a file system.

4. A method as recited in claim 1, where the snapshot is a first snapshot that includes a first replica of the data set taken at a first specified time, and the method further comprises:

accessing a second snapshot of the data set, the second snapshot including a second replica of the data set taken at a second specified time; and adding to the index, with respect to each of one or more objects included in the second snapshot, index data indicating at least where the object is located within the second snapshot.

5. A method as recited in claim 4, wherein the index includes an index entry for each object associated with the data set and adding index data to the index includes adding the index data to an index entry with which the object being indexed is associated.

6. A method as recited in claim 1, wherein the index includes for each object an index entry that includes, for each instance of the object encountered in one of said plurality of snapshots, version data associated with that instance of the object.

7. A method as recited in claim 6, wherein the version data includes data associating the instance with a snapshot time associated with the snapshot within which the instance is included.

8. A method as recited in claim 6, wherein the version data includes data indicating a time at which the instance of the object was last modified.

9. A method as recited in claim 1, wherein adding index data to the index includes creating an index entry for the object if one does not already exist.

10. A method of managing backup data, comprising:

accessing a snapshot of a data set, wherein the data set includes at least one object and there is a plurality of snapshots of the data set, each of the plurality of snapshots being taken at a particular time and each comprising a replica of the data set at that particular time, wherein accessing a snapshot includes mounting the snapshot and using a file system associated with the snapshot to locate and retrieve one or more objects included in the snapshot; and adding to an index stored in storage and associated with at least the accessed snapshot, with respect to each of one or more objects included in the accessed snapshot, index data indicating at least where each of the one or more objects is located within the accessed snapshot so that it is able to be determined using the index and without again accessing the accessed snapshot whether an object of interest is included in the accessed snapshot and if so, where the object of interest is located within the accessed snapshot.

11. A method as recited in claim 10, wherein the index data includes with respect to an object that has associated with it, in a hierarchical structure of the data set, one or more child objects, child object data for each child object indicating a location within the index of an entry associated with the child object.

12. A data backup system comprising:

a processor configured to:

access a snapshot of a data set, wherein the data set includes at least one object and there is a plurality of snapshots of the data set, each of the plurality of snapshots being taken at a particular time and each comprising a replica of the data set at that particular time; and add to an index associated with at least the accessed snapshot, with respect to each of one or more objects included in the accessed snapshot, index data indicating at least where each of the one or more objects is located within the accessed snapshot so that it is able to be determined using the index and without again accessing the accessed snapshot whether an object of interest is included in the accessed snapshot and if so, where the object of interest is located within the accessed snapshot, wherein the index is configured to be used to determine, without having to mount the accessed snapshot, whether the object of interest is included in the accessed snapshot; and a memory coupled to the processor, configured to provide the processor with instructions.

13. A system as recited in claim 12, where the snapshot is a first snapshot that includes a first replica of the data set taken at a first specified time, and the processor is further configured to:

access a second snapshot of the data set, the second snapshot including a second replica of the data set taken at a second specified time; and add to the index, with respect to each of one or more objects included in the second snapshot, index data indicating at least where the object is located within the second snapshot.

14. A system as recited in claim 12, wherein the index includes for each object an index entry that includes, for each instance of the object encountered in one of said plurality of snapshots, version data associated with that instance of the object.

15. A data backup system comprising:

a processor configured to:

access a snapshot of a data set, wherein the data set includes at least one object and there is a plurality of snapshots of the data set, each of the plurality of snapshots being taken at a particular time and each comprising a replica of the data set at that particular time, wherein accessing a snapshot includes mounting the snapshot and using a file system associated with the snapshot to locate and retrieve one or more objects included in the snapshot; and add to an index associated with at least the accessed snapshot, with respect to each of one or more objects included in the accessed snapshot, index data indicating at least where each of the one or more objects is located within the accessed snapshot so that it is able to be determined using the index and without again accessing the accessed snapshot whether an object of interest is included in the accessed snapshot and if so, where the object of interest is located within the accessed snapshot; and a memory coupled to the processor, configured to provide the processor with instructions.

16. A system as recited in claim 15, wherein the snapshot is stored locally with respect to the data set.

17. A system as recited in claim 15, wherein the index data includes with respect to an object that has associated with it, in a hierarchical structure of the data set, one or more child objects, child object data for each child object indicating a location within the index of an entry associated with the child object.

18. A computer program product for managing backup data, the computer program product being embodied in a computer readable storage medium and comprising computer instructions which when executed by a computer cause the computer to:

access a snapshot of a data set, wherein the data set includes at least one object and there is a plurality of snapshots of the data set, each of the plurality of snapshots being taken at a particular time and each comprising a replica of the data set at that particular time; and add to an index associated with at least the accessed snapshot, with respect to each of one or more objects included in the accessed snapshot, index data indicating at least where each of the one or more objects is located within the accessed snapshot so that it is able to be determined using the index and without again accessing the accessed snapshot whether an object of interest is included in the accessed snapshot and if so, where the object of interest is located within the accessed snapshot, wherein the index is configured to be used to determine, without having to mount the accessed snapshot, whether the object of interest is included in the accessed snapshot.

19. A computer program product as recited in claim 18, wherein the index includes for each object an index entry that includes, for each instance of the object encountered in one of said plurality of snapshots, version data associated with that instance of the object.

20. A computer program product as recited in claim 18, wherein the snapshot is stored locally with respect to the data set.

21. A computer program product for managing backup data, the computer program product being embodied in a computer readable storage medium and comprising computer instructions which when executed by a computer cause the computer to:

access a snapshot of a data set, wherein the data set includes at least one object and there is a plurality of snapshots of the data set, each of the plurality of snapshots being taken at a particular time and each comprising a replica of the data set at that particular time, wherein accessing a snapshot includes mounting the snapshot and using a file system associated with the snapshot to locate and retrieve one or more objects included in the snapshot; and add to an index associated with at least the accessed snapshot, with respect to each of one or more objects included in the accessed snapshot, index data indicating at least where each of the one or more objects is located within the accessed snapshot so that it is able to be determined using the index and without again accessing the accessed snapshot whether an object of interest is included in the accessed snapshot and if so, where the object of interest is located within the accessed snapshot.

22. A computer program product as recited in claim 21, where the snapshot is a first snapshot that includes a first replica of the data set taken at a first specified time, and the computer program product further comprises computer instructions for:

accessing a second snapshot of the data set, the second snapshot including a second replica of the data set taken at a second specified time; and adding to the index, with respect to each of one or more objects included in the second snapshot, index data indicating at least where the object is located within the second snapshot.

23. A computer program product as recited in claim 21, wherein the index data includes with respect to an object that has associated with it, in a hierarchical structure of the data set, one or more child objects, child object data for each child object indicating a location within the index of an entry associated with the child object.

* * * * *